(12) United States Patent
Rutjes et al.

(10) Patent No.: US 8,190,096 B2
(45) Date of Patent: May 29, 2012

(54) METHOD AND SYSTEM TO SELECT DEVICES OF A WIRELESS NETWORK, PARTICULARLY A NETWORK OF WIRELESS LIGHTING DEVICES

(75) Inventors: Alwin Rutjes, Eindhoven (NL); Jos Van Meurs, Eindoven (NL); Louis Groenendal, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 422 days.

(21) Appl. No.: 12/519,392

(22) PCT Filed: Dec. 14, 2007

(86) PCT No.: PCT/IB2007/055133
§ 371 (c)(1), (2), (4) Date: Oct. 15, 2009

(87) PCT Pub. No.: WO2008/078245
PCT Pub. Date: Jul. 3, 2008

(65) Prior Publication Data
US 2010/0036512 A1 Feb. 11, 2010

(30) Foreign Application Priority Data
Dec. 20, 2006 (EP) .................................... 06126678

(51) Int. Cl.
*H04B 17/00* (2006.01)
(52) U.S. Cl. ................... 455/67.11; 455/41.2; 455/3.01; 455/522
(58) Field of Classification Search .................. None
See application file for complete search history.

(56) References Cited

U.S. PATENT DOCUMENTS

| 4,744,083 | A | 5/1988 | O'Neill et al. |
| 2004/0209639 | A1* | 10/2004 | Kamperschroer et al. .... 455/522 |
| 2005/0079821 | A1* | 4/2005 | Bi ................................ 455/63.1 |
| 2005/0085254 | A1* | 4/2005 | Chuah et al. .................. 455/522 |
| 2005/0208952 | A1 | 9/2005 | Dietrich et al. |

(Continued)

FOREIGN PATENT DOCUMENTS
WO 9927465 A1 6/1999

OTHER PUBLICATIONS

"What light goes with which switch?", http://www.extremetech.com/article2/0,1697,1864143,00.asp, 2006, pp. 1-5.
Starlite, Control at the speed of light, http://www.centralite.com/products/StarLite/StarLite_2-20-06.pdf, 2006, pp. 1-2.

(Continued)

*Primary Examiner* — Zhiyu Lu
(74) *Attorney, Agent, or Firm* — Mark L. Beloborodov

(57) ABSTRACT

The invention relates to the selection of devices of a wireless network, particularly wireless home control networks, for example lighting control networks in buildings. It is an object of the invention to provide an improved method and System to select devices of a wireless network, particularly a network of wireless lighting devices. According to the invention, for selecting a certain device in the wireless network a broadcast message is sent out by a wireless remote device (S10). Only devices with a certain communication link quality respond with unicast messages (S20). The wireless remote device then sends a command to the device with best communication link quality for selecting this device. This enables a user to select devices without buttons in a wireless network.

12 Claims, 3 Drawing Sheets

U.S. PATENT DOCUMENTS

Figure 1A:
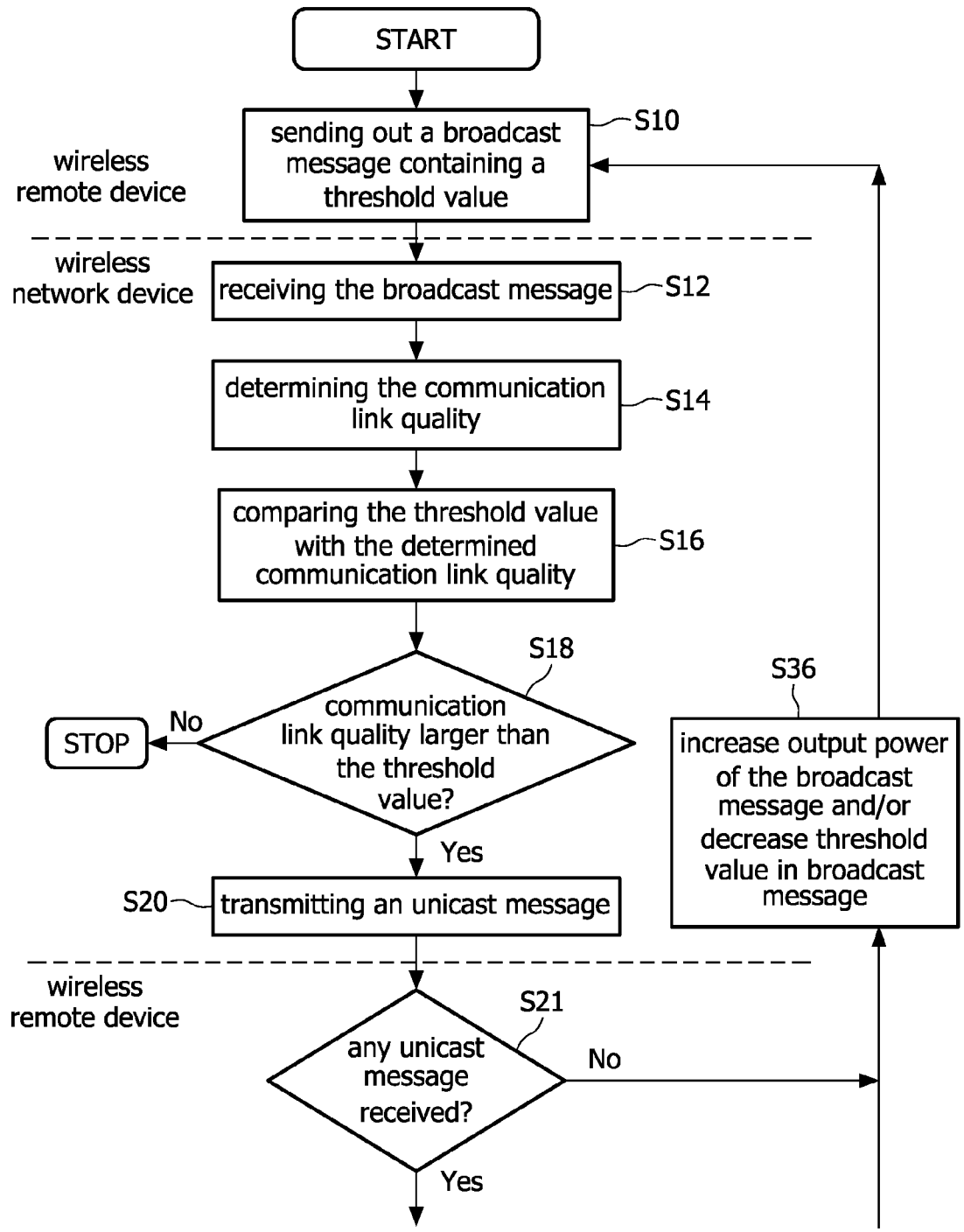

| | | |
|---|---|---|
| 2006/0044152 A1 | 3/2006 | Wang |
| 2006/0046659 A1* | 3/2006 | Haartsen et al. ........... 455/67.11 |
| 2009/0005109 A1* | 1/2009 | Nishio et al. ............... 455/550.1 |
| 2010/0144274 A1* | 6/2010 | Mcdowall et al. ........... 455/41.2 |

OTHER PUBLICATIONS

Simple device pairing by relative signal strengths, Zigbee from Cambridge Consultants, www.cambirdgeconsultants.com, 2005, pp. 1-2.

* cited by examiner

METHOD AND SYSTEM TO SELECT DEVICES OF A WIRELESS NETWORK, PARTICULARLY A NETWORK OF WIRELESS LIGHTING DEVICES

The invention relates to the selection of devices of a wireless network, particularly a network of wireless lighting devices or a wireless home control network, for example a lighting control network in a building.

Wireless networks such as wireless home control networks are becoming more and more popular. A preferred standard for these networks is ZigBee™ which allows to connect devices such as household appliances or sensors within a short distance of some meters. ZigBee™ is a protocol stack based on the IEEE standard 802.15.4 for wireless personal area networks.

However, managing a network of ZigBee™ devices may be a complex task, requiring a control computer for the network in order to connect for example a remote lighting controller with certain lights of a lighting system. In order to make management, particularly the process of creating connections easier, Cambridge Consultants (http://www.CambridgeConsultants.com) have developed a simple device pairing technique based on relative signal strengths. The technique uses the RSSI (received signal strength indication) measurement feature of ZigBee™ devices. For pairing, a remote control broadcasts a pairing message to all ZigBee™ devices in range upon pressing a pairing button of the remote control. The devices receiving the broadcast message take a RSSI measurement on the message. A pairing is then accomplished for the device with the best RSSI measurement. A description of the pairing technique using ZigBee™ may be downloaded from http://www.CambridgeConsultants.com/PDFs/Zibee_click_and_pair.pdf With this technique, the node or device of a ZigBee™ network, which is closest to the remote control, is paired with the remote control.

It is an object of the invention to provide an improved method and system to select devices of a wireless network, particularly a network of wireless lighting devices.

In order to achieve the object defined above, the invention provides a method to select devices of a wireless network, particularly a network of wireless lighting devices, wherein the method comprises the following characteristic features:

sending out a broadcast message at a first output power by a wireless remote device, wherein the broadcast message contains a first threshold value for a predetermined communication link quality, receiving the broadcast message by each of a plurality of devices of the wireless network, determining the communication link quality of the received broadcast message in each receiving device, comparing the threshold value contained in the broadcast message with the determined communication link quality in each receiving device, transmitting an unicast message containing the determined communication link quality and a device identifier to the remote control device by a receiving device if the communication link quality determined by a device is larger than the threshold value, and selecting the one of the devices with the largest value of determined communication link quality In order to achieve the object defined above, the invention provides a system to select devices of a wireless network, particularly a network of wireless lighting devices, wherein the system comprises the following characteristic features:

a wireless remote device adapted to send out a broadcast message at a first output power, wherein the broadcast message contains a first threshold value for a predetermined communication link quality, a plurality of devices of the wireless network each being adapted to receive the broadcast message, to determine the communication link quality of the received broadcast message, to compare the threshold value contained in the broadcast message with the determined communication link quality, and to transmit an unicast message containing the determined communication link quality and a device identifier to the remote control device if the communication link quality determined by a device is larger than the threshold value, and wherein the wireless remote device is further adapted to select the one of the devices with the largest value of determined communication link quality.

The characteristic features according to the invention provide the advantage that the selection of a device without a button in a wireless network may be performed automatically. Particularly, devices may be selected which are located within a certain range of a wireless remote device, which may serve as a kind a remote control. The range may be influenced by the threshold value, which serves as a kind of "filter" separating devices within a certain range from devices located outside the range. In other words, the threshold value determines a predefined communication link quality, which depends on the distance between the wireless remote device and each network device.

The term "wireless" especially comprises radio transmission, for example according to the before mentioned ZigBee™ standard, but it is not restricted to radio transmission. In principle, also other wireless transmission techniques such as light communication may be used with the invention.

In case of radio transmissions, the communication link quality may be represented with the RSSI measurement value of a received signal or message, respectively.

A "broadcast message" as used herein means a message, which is sent to a number of receivers in contrast to a "unicast message" which means a message being sent to a certain receiver. In networks, broadcast messages are usually used for searching certain network devices while unicast messages are used for a communication between a limited number of network devices, typically two devices. While an unicast message may contain the address of a certain receiver, a broadcast message usually does not have a specific address of network device. For example, in internet protocol (IP) networks, a broadcast message is sent to an IP address in which all bits of the host address are set to logical "1" (e.g. 255.255.255.255 broadcast over all networks).

The broadcast message may contain as a first threshold value for a predetermined communication link quality for example a certain predefined RSSI value. With the threshold value, the range of the wireless remote device may be determined. For example, selecting a large threshold may mean reducing the range while selecting a small threshold may mean a large range for selecting network devices.

A further factor influencing the range of device selection is the output power with which the broadcast message is sent out. The smaller the output power the smaller the range for selecting devices since the output power determines wireless coverage.

The invention allows to efficiently select network devices by a relatively simple communication procedure comprising essentially the sending out of a broadcast message and to process the "echo" in form of unicast messages of responding devices while the response depends on the distance between the wireless remote device and a receiving network device and the quality of the communication link.

According to an embodiment of the invention, the step of selecting of the method may comprise storing all unicast messages received from devices in the wireless remote device, sorting the stored unicast messages by the values of the contained determined communication link qualities in a list with the largest value of communication link quality on top of the list, and sending a command to the device on top of the list in order to select the device.

This embodiment has the advantage that the selection process may be implemented for example in form of a kind of sorting algorithm in the wireless remote device. Furthermore, it allows to quickly determine the network device which is located closest to the wireless remote device and, therefore, should be preferably selected. It may be provided that only unicast messages may be stored which were received during a certain predefined time window such as 50 milliseconds after sending out the broadcast message. According to this, the range for selection may be further restricted or reduced since only responses from network devices are received and considered which are located with a maximum distance corresponding to the time required for transmitting the broadcast message to a network device, processing the received broadcast message in the device and replying by sending an unicast message back to the wireless remote device.

According to a further embodiment of the invention, the command may be sent for a predefined time span, for example for 1.5 seconds. This allows a user to initiate a further selection process after the predefined time span. This means for example that the command is repeatedly sent for the predefined time span.

According to an embodiment of the invention, the method may further comprise the step of determining after the predefined time span whether a selection button is pressed, and sending a command to the next device in the list in order to select this device if the selection button is still pressed after the predefined time span.

A selection button may be a separate button for controlling and influencing the selection process. For example, if a user wishes to select another network device, she/he must merely press the selection button as long or as often until the desired network device is selected. An automatic scan mode, etc. is also possible for selecting a certain device.

According to a further embodiment of the invention, at least one further broadcast message is sent out at a second output power, which is higher than the first output power, by the wireless remote device, wherein the further broadcast message contains a second threshold value for a predetermined wireless communication link quality, which is smaller than the first threshold value. This is advantageous in the case that after sending out the first broadcast message at the first output power no unicast message was received, for example because the distance between the wireless remote device and the network devices was too large so that the determined communication link quality between the wireless remote device and each of the network devices, which received the broadcast message, was below the threshold value. In such case, automatically a further broadcast message may be sent out which contains a second threshold value smaller than the first threshold value. Moreover, the output power of the second broadcast message is increased compared to the output power used for sending out the first broadcast message. Thus, the range of the broadcast message is increased and by reducing the threshold value, the likelihood is increased that the communication link quality between the wireless remote device and at least one network device is sufficient. Further broadcast messages can be sent out at higher output powers and with further reduced threshold values until the communication link quality is sufficient for establishing a communication link between the wireless remote device and a network device. This method may be also applied to select devices that are further away, not necessarily because there weren't devices within range.

According to an embodiment of the invention, a computer program is provided, wherein the program is enabled to carry out the method according to the invention when executed by a computer. Furthermore, an embodiment of the invention provides a record carrier storing a computer program according to the invention.

According to a further embodiment of the invention, a computer programmed to perform a method according to the invention is provided, wherein the computer may comprise a wireless communication module adapted to send out broadcast messages and to receive unicast messages from a plurality of devices of the wireless network.

In the system according to an embodiment of invention, the wireless remote device may be further adapted to store all unicast messages received from devices, to sort the stored unicast messages by the values of the contained determined communication link qualities in a list with the largest value of communication link quality on top of the list, and to send a command to the device on top of the list in order to select the device.

According to a further embodiment of the invention, the wireless remote device may be adapted to send the command for a predefined time span.

The wireless remote device may be according to a further embodiment of the invention adapted to determine after the predefined time span whether a selection button is pressed, and to send a command to the next device in the list in order to select this device if the selection button is still pressed after the predefined time span.

The wireless remote device may be according to an embodiment of the invention further adapted to send out at least one further broadcast message at a second output power, which is higher than or equal to the first output power, wherein the further broadcast message contains a second threshold value for a predetermined wireless communication link quality, which is smaller than or equal to the first threshold value.

According to an embodiment of the invention, in the system the devices of the wireless network may be lighting devices each being adapted for a wireless control, and the wireless remote device may be a wireless lighting controller.

According to a further embodiment of the invention, a wireless remote device may be provided which is adapted for selecting devices of a wireless network according to a method according to the invention and may comprise a transceiver for sending out and receiving messages via a wireless communications link, and a controller configured to process received messages from the devices and to select the one of the devices with the largest value of a determined communication link quality.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

Figure 1B:
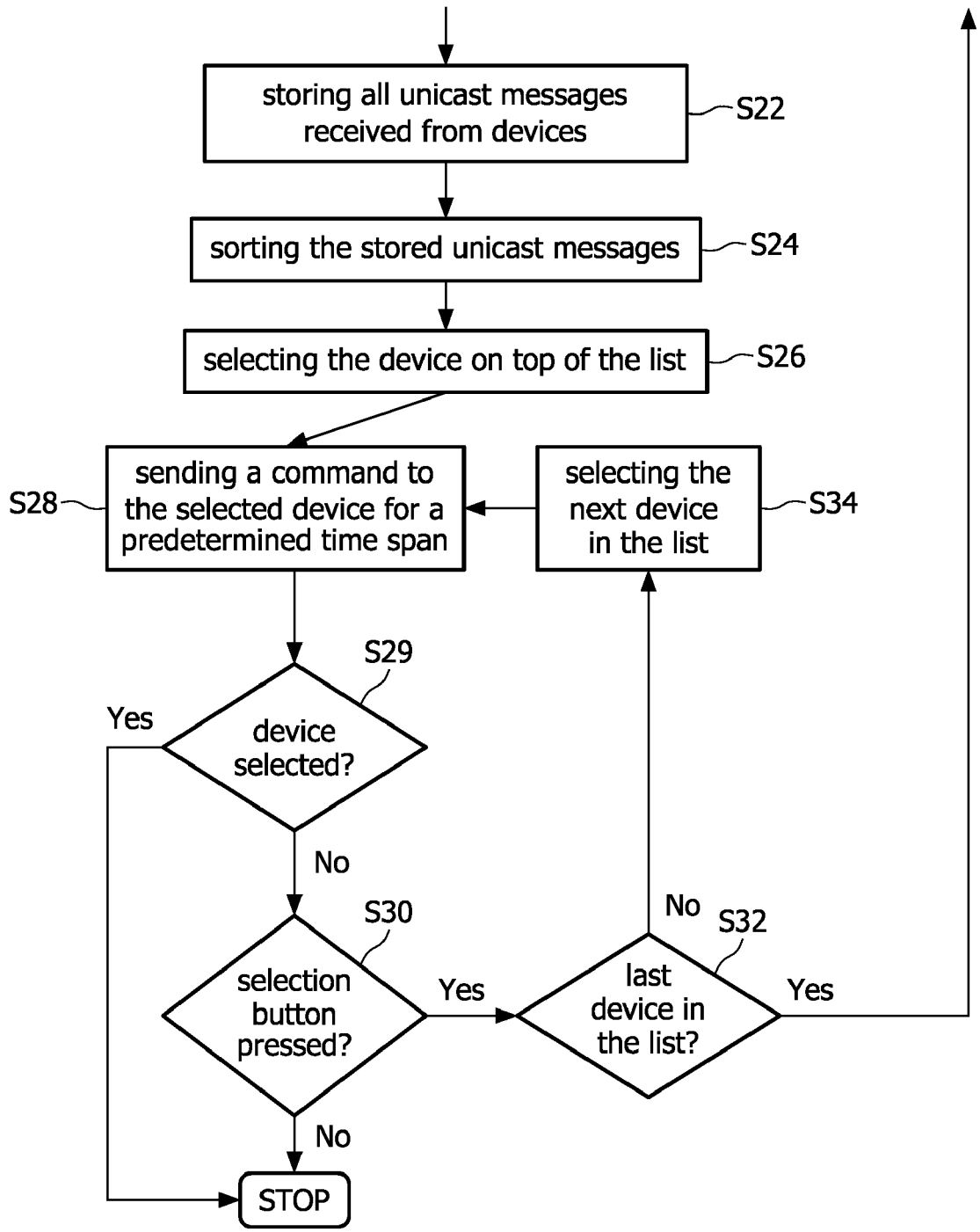
Figure 2:
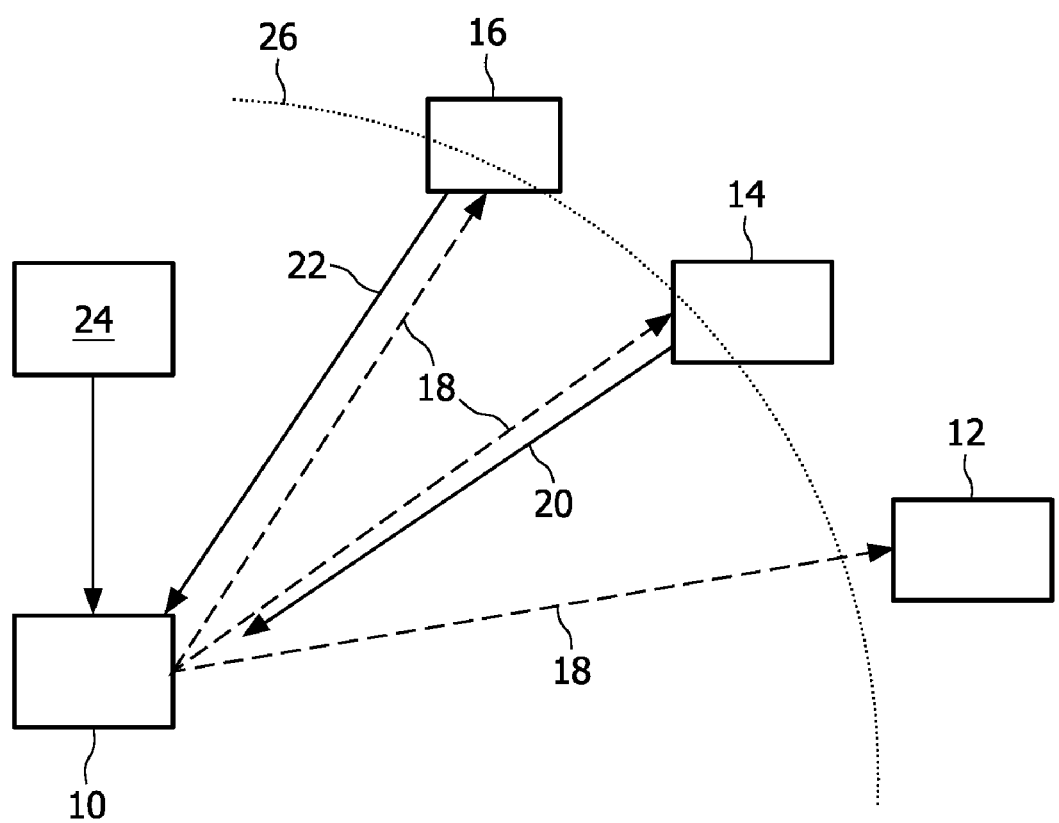

FIGS. 1A and 1B shows a flowchart of an embodiment of a method to select devices of a wireless network according to the invention; and FIG. 2 an embodiment of a system to select devices of a wireless network according to the invention.

The invention will now be explained by means of an exemplary wireless home lighting control system. This lighting control system comprises a number of lighting devices, which comprise RF communication means. The lighting devices are integrated in a wireless control network using for example ZigBee™ for communicating with a wireless remote device such as a wireless lighting remote controller. The invention now enables a user to select certain lighting devices in the network only with the wireless lighting remote controller. The wireless lighting remote controller may be implemented for example as a separate device similar to the remote controller for a TV set, but it may also embodied in software which may be executed by a Personal Computer (PC) comprising a wireless communication module in order to be able to communicate with the wireless lighting devices.

FIG. 2 shows a block diagram of the wireless home lighting control system with the wireless lighting remote controller 10, three wireless lighting devices 12, 14, and 16, and a selection button 24 (also called "magic wand button" since it allows similar to a wand mounted selection button to select a certain lighting device). For selecting a certain wireless lighting device 12, 14, or 16, the wireless home remote controller 10 sends out a broadcast message 18 via its wireless RF communication module. The broadcast message 18, which contains a first threshold value for a predetermined communication link quality, is send out at a first output power. The first threshold value corresponds to a certain RSSI value. Both the first threshold value and the first output power determine the range within a selection of devices is desired. This range is intimated in FIG. 2 with the dotted line 26. In the shown situation, the wireless lighting device 12 is located outside the range 26 and, therefore, should not take part in the selection process as will be explained later in more detail with regard to FIGS. 1A and 1B. The devices 14 and 16 located at the border of the range 26 respond to the broadcast message 18 with unicast messages 20 and 22, respectively. Via the selection button 24, a user can further influence the automatic selection process as will be also explained in more detail later.

FIG. 1A shows a flowchart for selecting a certain wireless device in the network. The flowchart is continued in FIG. 1B. In a first step S10 as already mentioned, the wireless lighting remote controller or the wireless remote device, respectively, sends out the broadcast message for initiating a selection of a certain wireless network device, in FIG. 2 a wireless lighting device. The broadcast message determines a certain desired communication link quality and, therefore, the desired distance for selection from the wireless remote device by comprising a first threshold value defining a requried communication link quality. Furthermore, the broadcast message is send out at a relatively low output power, thus reaching only devices in the close neighborhood of the wireless remote device, for example within a range of several meters.

The following steps of the described method are performed in each wireless network device receiving and processing the broadcast message. In a third step S14, the communication link quality is determined by performing a RSSI measurement of the received broadcast message as one parameter of the communication link quality. Even if other parameters representing the communication link quality may be determined, the RSSI measurement is a commonly applied measure to determine a RF communication link quality. Also, many available standard RF electronic components are able to perform RSSI measurements, thus not requiring extra hard- or software to determine the communication link quality. The RSSI measurement value is then compared with the first threshold value contained in the broadcast message in a step S16. This may be performed for example by a microcontroller of a wireless network device executing an embedded software or a dedicated hardware, such as a logical circuitry. In a following step S18, it is determined whether the RSSI measurement value is larger or smaller than the predefined first threshold value. If it is determined in a wireless network device that the RSSI measurement value is smaller than the first threshold value, the communication link quality is too poor in order to select the device. In this case, the device stops to do further processing. Otherwise, the device appears to be located within the desired range for selection and prepares an unicast message, containing the network address of the wireless remote device, an unique wireless network device identifier, for example the network address, and the RSSI measurement value. This unicast message is then transmitted in a step S20 via the RF transceiver circuitry of the wireless network device.

The following steps of the described method are again performed in the wireless remote device receiving and processing the unicast messages. The wireless remote device first checks whether any unicast message was received in a step 21, for example after a predefined time span after sending out the broadcast message in step S10 such as a few seconds. If the wireless remote device detects in step S21 that no unicast message was received, for example because no wireless network device is located within the range of the broadcast message, the method continues with a step S36, in which the output power of the broadcast message to be sent out is increased and/or the threshold value in the broadcast message corresponding to a certain RSSI measurement value is decreased. After performing step S36, the method continues with step S10 again sending out a further broadcast message. However, if the wireless remote device determines in step S21 that one or more unicast messages were received, it stores all received unicast messages in form of a list in an internal memory (step S22). If the received unicast messages are replies to a further broadcast message, only the received unicast messages not yet received are stored. All unicast messages which were already received as reply to a preceding broadcast message for example with a lower output power are not stored in order to make it easier for a user to select a desired wireless remote device. In other words, if a user did not select any wireless remote device in a first round where a broadcast message was sent out at a first output power, the unicast messages received from devices during the first round are no longer of interest for the user during a second round where a second broadcast message is sent out at a second output power, which is higher than the first output power, for accessing wireless remote devices in a larger range.

In a next step S24, the method sorts the stored unicast messages in the list such that the unicast message with the largest RSSI measurement value, i.e. with the best communication link quality, is on top of the list. Only the first set of received unicast messages, i.e. only the unicast messages received within a predefined time span of for example 50 milliseconds after sending out the broadcast message are taken into account for sorting. Unicast messages, which are received after the predefined time span, are only added below the list in the internal memory and not sorted on the RSSI measurement value. After the sorting, the wireless remote device selects the device on top of the list in step S26 and sends a command, in case of wireless lighting devices for example a temporary blink command, to the selected wireless network device (step S28). In order to perform this, the wireless remote device reads the list entry of the selected device, extracts the unique wireless network device identifier, determines the network address of the device identified by the identifier, prepares a message containing the command, and sends the prepared message with the command to the selected wireless network device. The message is sent for a predefined time span, (This can also be a selection command at the start and un-select at the end of the 1.5 seconds.) for example for 1.5 seconds in order to enable a user to select whether she/he desires to choose the addressed wireless network device or not. Since the sent command causes a certain action of the addressed wireless network device, the user may note that action, for example that a lamp is blinking. This allows her/him to comfortably select this device within the time span of 1.5 seconds, or to skip the selection of this device as will be explained in the following.

The user selection is determined by receiving a status signal from a selection button (button 24 in FIG. 2). In case of lighting system, this selection button may be a so called magic wand button which is provided for performing certain user operations with the lighting system. In a step S29, it is checked whether any device was selected. If a device was selected, the method stops. Otherwise, it continues with step S30, in which it is checked whether the above mentioned selection button is pressed by a user. If the button is not pressed, the selection process is finished, and the lastly selected wireless network device, for example the blinking lamp is switched permanently on. However, if the wireless remote device determines from the status signal received from the selection button 24, that the button is still pressed after the time span of 1.5 seconds, the selection process continues with step S32, with which it is checked whether the actual selected device is the last device in the list. If not, the next device in the list, i.e. the device with a smaller RSSI measurement value than that of the lastly selected device is selected in a following step S34. Thereafter, the process continues with step S28 and sends a command to the selected device, for example a temporary blink command so that the next lamp blinks.

However, if it is determined in step S32 that the last device in the list is already selected, the process continues with the above described step S36 before returning to step S10 in order to perform a further selection process for wireless network devices with a further broadcast message with an increased detection range. This further selection process may be performed with a higher output power of the broadcast message in order to enlarge the range for selection, i.e. in order to include also wireless network devices with a larger distance from the wireless remote device. Also, the threshold value may be set to a second threshold value which is smaller than the first threshold value in order to reduce the requirements for the communication link quality and to include also wireless network devices located more far away from the wireless remote device.

The invention is suitable to select a wireless network device without a pressing a button on the device which is much more comfortable than to use either a complex control software for programming for example a complex lighting system with a plurality of wireless lighting devices distributed in a large building or at least a large room or hall. Furthermore, selection buttons on wireless network devices may be saved. The invention is particularly suitable for application in modern lighting systems comprising a network of wireless lighting devices, which may be controlled, i.e. switched on or off or dimmed by a wireless remote controller. However, the invention may be also applied to other networks such as home media networks, household appliances networks, and general home control networks.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method to select devices (12, 14, 16) of a wireless network, particularly a network of wireless lighting devices, comprising the following steps:
   sending out a broadcast message (18) at a first output power by a wireless remote device (10), wherein the broadcast message contains a first threshold value for a predetermined communication link quality (S10),
   receiving the broadcast message (18) by each of a plurality of devices (12, 14, 16) of the wireless network (S12),
   determining the communication link quality of the received broadcast message in each receiving device (S14),
   comparing the threshold value contained in the broadcast message with the determined communication link quality in each receiving device (S18),
   transmitting an unicast message (20, 22) containing the determined communication link quality and a device identifier to the remote control device (10) by a receiving device (14, 16) if the communication link quality determined by a device is larger than the threshold value (S18, S20), and
   selecting the one of the devices with the largest value of determined communication link quality (S22, S24, S26, S28, S30, S32, S34).

2. The method of claim 1, wherein the step of selecting comprises
   storing all unicast messages (20, 22) received from devices (14, 16) in the wireless remote device (10; S22),
   sorting the stored unicast messages by the values of the contained determined communication link qualities in a list with the largest value of communication link quality on top of the list (S24), and
   sending a command to the device on top of the list in order to select the device (S26, S28).

3. The method of claim 2, wherein the command is sent for a predefined time span.

4. The method of claim 3, further comprising the step of
   determining after the predefined time span whether a selection button is pressed (S30), and
   sending a command to the next device in the list in order to select this device if the selection button is still pressed after the predefined time span (S28, S32, S34).

5. The method of claim 4, wherein at least one further broadcast message (18) is sent out at a second output power, which is higher than the first output power, by the wireless remote device (10), wherein the further broadcast message contains a second threshold value for a predetermined wireless communication link quality, which is smaller than the first threshold value.

6. A system to select devices (12, 14, 16) of a wireless network, particularly a network of wireless lighting devices, comprising a wireless remote device (10) adapted to send out a broadcast message (18) at a first output power, wherein the broadcast message (18) contains a first threshold value for a predetermined communication link quality, a plurality of devices (12, 14, 16) of the wireless network each being adapted to receive the broadcast message (18), to determine the communication link quality of the received broadcast message, to compare the threshold value contained in the broadcast message with the determined communication link quality, and to transmit an unicast message (20, 22) containing the determined communication link quality and a device identifier to the remote control device (10) if the communication link quality determined by a device is larger than the threshold value, and wherein the wireless remote device (10) is further adapted to select the one of the devices with the largest value of determined communication link quality.

7. The system of claim 6, wherein the wireless remote device (10) is further adapted to store all unicast messages (20, 22) received from devices (14, 16), to sort the stored unicast messages by the values of the contained determined communication link qualities in a list with the largest value of communication link quality on top of the list, and to send a command to the device on top of the list in order to select the device.

8. The system of claim 7, wherein the wireless remote device (10) is further adapted to send the command for a predefined time span.

9. The system of claim 8, wherein the wireless remote device is further adapted to determine after the predefined time span whether a selection button (24) is pressed, and to send a command to the next device in the list in order to select this device if the selection button (24) is still pressed after the predefined time span.

10. The system of claim 9, wherein the wireless remote device (10) is further adapted to send out at least one further broadcast message at a second output power, which is higher than or equal to the first output power, wherein the further broadcast message contains a second threshold value for a predetermined wireless communication link quality, which is smaller than or equal to the first threshold value.

11. The system of claim 6, wherein the devices (12, 14, 16) of the wireless network are lighting devices each being adapted for a wireless control, and the wireless remote device (10) is a wireless lighting controller.

12. A wireless remote device (10) adapted for selecting devices of a wireless network according to claim 1 and comprising a transceiver for sending out and receiving messages via a wireless communications link, and a controller configured to process received messages from the devices and to select the one of the devices with the largest value of a determined communication link quality.

* * * * *